United States Patent
Wang et al.

(10) Patent No.: US 12,448,390 B1
(45) Date of Patent: Oct. 21, 2025

(54) COMPOUND WITH α-GLUCOSIDASE INHIBITORY ACTIVITY AND APPLICATION THEREOF

(71) Applicant: China Agricultural University, Beijing (CN)

(72) Inventors: Ran Wang, Beijing (CN); Fengyu Guo, Beijing (CN); Pengjie Wang, Beijing (CN); Ping Liu, Beijing (CN); Weibo Zhang, Beijing (CN); Chong Chen, Beijing (CN); Fazheng Ren, Beijing (CN); Siyuan Liu, Beijing (CN); Bing Fang, Beijing (CN); Yixuan Li, Beijing (CN)

(73) Assignee: China Agricultural University, Beijing (CN)

( * ) Notice: Subject to any disclaimer, the term of this patent is extended or adjusted under 35 U.S.C. 154(b) by 0 days.

(21) Appl. No.: 19/031,233

(22) Filed: Jan. 17, 2025

(30) Foreign Application Priority Data

Jul. 31, 2024 (CN) .......................... 202411036568.9

(51) Int. Cl.
*C07D 491/052* (2006.01)
*A61K 31/436* (2006.01)

(52) U.S. Cl.
CPC ........ *C07D 491/052* (2013.01); *A61K 31/436* (2013.01)

(58) Field of Classification Search
CPC ........................... C07D 491/052; A61K 31/436
See application file for complete search history.

(56) References Cited

FOREIGN PATENT DOCUMENTS

| CN | 112939947 A | 6/2021 |
| RU | 2261251 | * 9/2005 |

OTHER PUBLICATIONS

Martin Lindh, Fredrik Svensson, Wesley Schaal, Jin Zhang, Christian Sköld, Peter Brandt, and Anders Karlén Journal of Chemical Information and Modeling 2015 55 (2), 343-353.*
ACS STN REG, RN: 2470244-12-1, 1327171-94-7, 1322259-38-0, 1322006-42-7, 1321716-68-0, 896384-64-8, 896384-57-9 etc.; Sep. 2, 2020.
Synthesis and antimicrobial activity of 5-hydroxymethyl-8-methyl-2-(N-arylimino)-pyrano[2,3-c]pyridine-3-(N-aryl)-carboxamides, Irina O. Zhuravel etc. Bioorganic & Medicinal Chemistry Letters 15 (2005) 5483-5487; Sep. 23, 2005.
In Silico Identification of Antifungal Compounds as Mutant DHFRase Inhibitors: Structure-based Approach, Molecular Dynamics Simulation and Structural Integrity Analysis , Basak, Trambak etc. Journal of Computational Biophysics and Chemistry (2021), 20(6), 589-602; Aug. 28, 2021.

* cited by examiner

*Primary Examiner* — Valerie Rodriguez-Garcia (57) ABSTRACT

The present invention belongs to the technical field of chemical drugs, and specifically to a compound with a-glucosidase inhibitory activity and application thereof. 5-hydroxymethyl-8-methyl-2-(N-arylamino)-pyrano[2,3-c]pyridine-3-(N-aryl)-formamide series compound is provided, possessing a structure in General formula (I). Compared with compounds with anti-diabetes activity in general sense, the compound with the strong anti-diabetes activity of the present disclosure has the apparently more important application value.

3 Claims, 2 Drawing Sheets

COMPOUND WITH α-GLUCOSIDASE INHIBITORY ACTIVITY AND APPLICATION THEREOF

CROSS REFERENCE TO THE RELATED APPLICATIONS

This application is based upon and claims priority to Chinese Patent Application No. 202411036568.9, filed on Jul. 31, 2024, the entire contents of which are incorporated herein by reference.

TECHNICAL FIELD

The present disclosure belongs to the technical field of chemical drugs, and specifically to a compound with a-glucosidase inhibitory activity and application thereof.

BACKGROUND

In the treatment of obesity and diabetes, the control of postprandial blood glucose receives extensive attention, because the postprandial blood glucose is closely related to the complications of diabetes. The control of the postprandial blood glucose mainly involves controlling starch digestive enzymes, which mainly include amylase secreted by pancreas, salivary amylase, and a-glucosidase. At present, drugs (including acarbose, voglibose, and miglitol) commonly used in clinical practice mainly inhibit a-amylase and a-glucosidase. However, it is precisely due to the severe inhibition of these two enzymes that a large amount of starch may not be digested. Most of the starch undigested may cause widespread gastrointestinal side effects, such as intestinal flatulence caused by microbial fermentation of the starch in colons. Therefore, in order to strengthen applications of starch digestive enzyme inhibitors and improve patients' medication experience, it is necessary to develop a new inhibitor to solve the serious deficiencies of existing clinical drugs.

At present, it is reported from documents that compounds with structures of benzopyran, benzimidazole, quinoline, and acetamide have a-glucosidase inhibitory activity. For example, a compound b using quinoline and acetamide as a structure basis, it has an IC50 value of 30.2 μM for the a-glucosidase, and has the extremely high inhibitory activity.

a b c

SUMMARY

On the basis of the above researches, the present disclosure synthesizes a 5-hydroxymethyl-8-methyl-2-(N-arylamino)-pyrano[2,3-c]pyridine-3-(N-aryl)-formamide series compound, and biological activity testing results indicate that the compound synthesized has the good a-glucosidase inhibitory activity.

A first aspect of the present disclosure is to provide a 5-hydroxymethyl-8-methyl-2-(N-arylamino)-pyrano[2,3-c]pyridine-3-(N-aryl)-formamide compound having a structure shown in General formula (I) below:

(I)

In a specific embodiment, R1 and R2 are the same or different; R1 and/or R2 are selected from the following groups: hydrogen, halogen, alkyl, alcoholic hydroxyl, alkenyl, alkynyl, arylalkyl, alkylaryl, aryl, heteroaryl, and quaternary ammonium salt group. Preferably, R1 and R2 are halogen or C1-C10 alcoholic hydroxyl. Further, R1 is halogen, R2 is a C1-C2 alcoholic hydroxyl. More preferably, R1 is chlorine and R2 is ethanol; and most preferably, R1 is 4-Cl and R2 is 3-methylalcohol.

In a second aspect, the present invention provides that a preparation method for the compound as stated in the first aspect, comprising the following steps:

Preferably, the described method is:
(1) using pyridoxal hydrochloride and 2-cyano-N-arylacetamide as raw materials, reacting at 40-45° C. for 15~25 min in the presence of pyridine and anhydrous methanol, self-assembling a 2-H-pyrano[2,3-c]pyridine heterocyclic system of intermediate 2-cyanoacrylamide, and precipitating from a reaction mixture to obtain 2-imino-5-hydroxymethyl-8-methyl-2H-pyrano[3,2-c]pyridine-3-formamide; and
(2) using 2-amino-5-hydroxymethyl-8-methyl-2H-pyrano[3,2-c]pyridine-3-formamide an d aniline as raw materials, and reacting in a boiling acetic acid for 20-30 min, to genera the the compound in General formula (I).
More preferably, step (2), a crystal is formed when cooled to a room temperature, and the compound (I) is insulated from the reaction mixture by filtration.
The molar ratio of pyridoxal hydrochloride and 2-cyano-N-arylacetamide in Step (1) is 1~1.5:1. Preferably, 1.2:1.
The molar ratio of piperidine added in Step (1) and the molar ratio of pyridoxal hydrochloride and 2-cyano-N-arylacetamide are 1~3:1~1.5:1. Preferably, 2:1.2:1.

A third aspect of the present invention is to provide a pharmaceutical composition for treating diabetes, wherein the pharmaceutical composition comprises the compound as stated in the first aspect and a pharmaceutically acceptable carrier.

A fourth aspect of the present invention is provided the use of the compound as stated in the first aspect in preparation of a drug for treating diabetes.

A fifth aspect of the present invention is provided a method for treating diabetes comprising administering a compound according to claim 1 to a patient in need thereof.

A sixth aspect of the present invention is to provide the use of the compound as stated in the first aspect or the method as stated in the second aspect in preparation of an a-glucosidase inhibitor.

The Present Disclosure has the Following Beneficial Effects:

The present disclosure firstly finds that although many 5-hydroxymethyl-8-methyl-2-(N-arylamino)-pyrano[2,3-c]pyridine-3-(N-aryl)-formamide (GFY) analogues have potential anti-diabetes effects, their activity strong and weak levels are largely affected by different combination forms of selected substituents. Even with the same mother nucleus structure, the different types of the substituents may cause significant changes in its activity.

Secondly, the inventor limits the structure of the compound claimed to a situation shown in Formula (I) and imposes very strict limitations on the substituents on it. Compared with compounds with anti-diabetes activity in general sense, the compound with the strong anti-diabetes activity of the present disclosure has the apparently more important application value.

DETAILED DESCRIPTION OF THE EMBODIMENTS

In order to make those skilled in the art better understand that the technical scheme of the invention can be implemented, the invention is further explained below in combination with specific embodiments, but the mentioned embodiments do not serve as a limitation of the invention.

The experimental methods described in the following embodiments are conventional methods without special instructions; the designed reagents and materials can be purchased on the market without special instructions.

Embodiment 1: Compound Synthesis 5-hydroxymethyl-8-methyl-2-(N-arylamino)-pyrano[2,3-c]pyridine-3-(N-aryl)-forma mide shown in Formula (I) was prepared, and the compound was numbered as GFY-14 (R1 was selected from 4-Cl—, and R2 was selected from 3-CH2OH—), comprising the following steps:

(1)

GFY-14

The specific preparation process was as follows: 488.68 mg (2.4 mmol) of pyridoxal hydrochloride and 356.32 mg (2 mmol) of N-4-chloro-2-cyanoacetamide were added to a 10 ml round-bottom flask, and 4 ml of methanol was aspirated by using a pipette and added to the flask. The flask was placed in an oil bath and heated to 40-45° C. under stirring, and then 395 μl (4 mmol) of piperidine was slowly added. Initial reaction solution was yellow turbid liquid, it gradually became transparent as the reaction progressed, and then a precipitate was separated out. A mixture obtained was stilly placed at 40-45° C. for 20 min, and a reaction product might form a precipitate to separate out. The precipitate formed was filtered, washed with methanol, and recrystallized from obtain ethanol, to yellow solid (N-(4-chlorophenyl)-5-(hydroxymethyl)-2-imido-8-methyl-2-hydro-pyrano [2,3-c]pyridine-3-for mamide) with a yield of 63%.

343.77 mg (1 mmol) of N-(4-chlorophenyl)-5-(hydroxymethyl)-2-imino-8-methyl-2-hydro-pyrano[2,3-c] pyridine-3-form amide and 147.78 mg (1.2 mmol) of 3-aminobenzyl alcohol were added to a 10 ml round-bottom flask, and then 5 ml of a glacial acetic acid was aspirated by the pipette and added to the round-bottom flask. The flask was placed in the oil bath, and heated to 115° C. under stirring, and it was reacted for 20-30 min. Then, a reaction mixture was cooled to a room temperature, and a precipitated product was filtered, and recrystallized from ethanol, dimethyl formamide (DMF), or ethanol-DMF, to obtain a yellow solid with a yield of 62%.

Embodiment 2: Synthesis of Series Compound

The same method as in Embodiment 1 was used to prepare other series of compounds GFY-1~GFY-13, as well as GFY-15~GFY-31, and the difference was only that N-4-chloro-2-cyanoacetamide and 3-aminobenzyl alcohol used were replaced by N-2-cyanoacetamide derivative and aniline derivative as shown in the above process flow diagram, and the selection of R substituents here was the same as the definition of R in the present disclosure.

Physicochemical data of the compound GFY-1~GFY-31 prepared in Embodiment 1-2 were shown in Table 1 below; and their 1H-NMR, 13C-NMR, and HRMS data were shown in Table 2.

TABLE 1

Physicochemical data of the compound GFY-1~GFY-31

| Compd. | R1 | R2 | Molecular Formular | State(r.t.) | Yield/% |
|---|---|---|---|---|---|
| GFY-1 | 4-F— | 5-CF$_3$— | C$_{24}$H$_{17}$F$_4$N$_3$O$_3$ | Yellow solid | 65 |
| GFY-2 | 4-F— | 4-CF$_3$— | C$_{24}$H$_{17}$F$_4$N$_3$O$_3$ | Yellow solid | 23 |
| GFY-3 | 4-F— | 6-OCH$_3$— | C$_{24}$H$_{20}$FN$_3$O$_4$ | Yellow solid | 53 |
| GFY-4 | 4-F— | 5-OCH$_3$— | C$_{24}$H$_{20}$FN$_3$O$_4$ | Yellow solid | 62 |
| GFY-5 | 4-F— | 4-OCH$_3$— | C$_{24}$H$_{20}$FN$_3$O$_4$ | Yellow solid | 49 |
| GFY-6 | 4-F— | 5-CH$_2$OH— | C$_{24}$H$_{20}$FN$_3$O$_4$ | Yellow solid | 59 |
| GFY-7 | 4-F— | 3-OH—5—CH$_2$OH— | C$_{24}$H$_{20}$FN$_3$O$_5$ | Yellow solid | 47 |
| GFY-8 | 4,6-2F— | 5-CH$_2$OH— | C$_{24}$H$_{19}$F$_2$N$_3$O$_4$ | Yellow solid | 60 |
| GFY-9 | 4,6-2F— | 3-OH—5—CH$_2$OH— | C$_{24}$H$_{19}$F$_2$N$_3$O$_5$ | Yellow solid | 58 |
| GFY-10 | 4-Br— | 5-CH$_2$OH— | C$_{24}$H$_{20}$BrN$_3$O$_4$ | Yellow solid | 64 |
| GFY-11 | 4-Br— | 3-OH—5—CH$_2$OH— | C$_{24}$H$_{20}$BrN$_3$O$_5$ | Yellow solid | 68 |
| GFY-12 | 4,5-2F— | 5-CH$_2$OH— | C$_{24}$H$_{19}$F$_2$N$_3$O$_4$ | Yellow solid | 54 |
| GFY-13 | 4,5-2F— | 3-OH—5—CH$_2$OH— | C$_{24}$H$_{19}$F$_2$N$_3$O$_5$ | Yellow solid | 48 |
| GFY-14 | 4-Cl— | 3-CH$_2$OH— | C$_{24}$H$_{20}$ClN$_3$O$_4$ | Yellow solid | 62 |
| GFY-15 | 4-Cl— | 3-OH—5—CH$_2$OH— | C$_{24}$H$_{20}$ClN$_3$O$_5$ | Yellow solid | 61 |
| GFY-16 | 4-F—5-Cl | 5-CH$_2$OH— | C$_{24}$H$_{19}$ClFN$_3$O$_4$ | Yellow solid | 59 |
| GFY-17 | 4-F—5-Cl— | 3-OH—5—CH$_2$OH— | C$_{24}$H$_{19}$ClFN$_3$O$_5$ | Yellow solid | 57 |
| GFY-18 | 4-F—5-Cl— | 3-C$_3$H$_7$—N0— | C$_{25}$H$_{20}$ClFN$_4$O$_4$ | Yellow solid | 63 |
| GFY-19 | 4,6-2F— | 3-C$_3$H$_7$—N0— | C$_{25}$H$_{20}$F$_2$N$_4$O$_4$ | Yellow solid | 66 |
| GFY-20 | 4-F— | 4-F— | C$_{23}$H$_{17}$F$_2$N$_3$O$_3$ | Yellow solid | 68 |
| GFY-21 | 4-F— | 3,5-2F— | C$_{23}$H$_{16}$F$_3$N$_3$O$_3$ | Yellow solid | 69 |
| GFY-22 | 4-F— | 3,4-2F— | C$_{23}$H$_{16}$F$_3$N$_3$O$_3$ | Yellow solid | 58 |
| GFY-23 | 4-F—5-Cl— | 4-F— | C$_{23}$H$_{15}$ClF$_2$N$_3$O$_3$ | Yellow solid | 63 |

TABLE 1-continued

Physicochemical data of the compound GFY-1~GFY-31

| Compd. | R1 | R2 | Molecular Formular | State(r.t.) | Yield/% |
|---|---|---|---|---|---|
| GFY-24 | 4-F—5-Cl— | 3,5-2F— | $C_{23}H_{15}ClF_3N_3O_3$ | Yellow solid | 59 |
| GFY-25 | 4-F—5-Cl— | 3,4-2F— | $C_{23}H_{15}ClF_3N_3O_3$ | Yellow solid | 64 |
| GFY-26 | 4-F—5-Cl— | 4-Cl— | $C_{23}H_{16}Cl_2FN_3O_3$ | Yellow solid | 67 |
| GFY-27 | 4-F—5-Cl— | 3,5-2Br— | $C_{23}H_{15}Br_2ClFN_3O_3$ | Yellow solid | 61 |
| GFY-28 | 4-F—5-Cl— | 3,4-2Br— | $C_{23}H_{15}Br_2ClFN_3O_3$ | Yellow solid | 56 |
| GFY-29 | 4-F— | 3,5-2Br— | $C_{23}H_{16}Br_2FN_3O_3$ | Yellow solid | 57 |
| GFY-30 | 4-F— | 3,4-2Br— | $C_{23}H_{16}Br_2FN_3O_3$ | Yellow solid | 63 |
| GFY-31 | 4-F— | 4-Cl— | $C_{23}H_{17}ClFN_3O_3$ | Yellow solid | 68 |

TABLE 2

1H—NMR, 13C—NMR, and HRMS data of the compound GFY-1~GFY-31

| Compd. | $^1$H—NMR(DMSO-d6, 500 MHz, TMS), δ(ppm) | $^{13}$C—NMR(DMSO-d6, 126 MHz, TMS), δ(ppm) | HRMS(m/z) |
|---|---|---|---|
| GFY-1 | δ 11.92 (s, 1H), 8.66 (s, 1H), 8.32 (s, 1H), 7.89 (s, 1H), 7.77 (dd, J = 9.2, 5.0 Hz, 2H), 7.67 (d, J = 5.3 Hz, 2H), 7.56 (t, J = 4.4 Hz, 1H), 7.24 (t, J = 8.9 Hz, 2H), 5.57 (t, J = 5.3 Hz, 1H), 4.77 (d, J = 5.3 Hz, 2H), 2.31 (s, 3H). | δ 159.80, 158.14, 149.34, 146.65, 145.91, 145.10, 143.57, 137.12, 134.85, 132.04, 130.54, 128.02, 126.45, 122.48, 122.29, 122.23, 121.86, 120.06, 116.27, 116.10, 58.47, 18.45. | 472.1288 |
| GFY-2 | δ 11.88 (s, 1H), 8.66 (s, 1H), 8.33 (s, 1H), 7.82 – 7.75 (m, 4H), 7.61 (d, J = 8.2 Hz, 2H), 7.24 (t, J = 8.9 Hz, 2H), 5.58 (t, J = 5.3 Hz, 1H), 4.78 (d, J = 5.3 Hz, 2H), 2.33 (s, 3H). | δ 160.06 (d, J = 43.3 Hz), 158.60, 149.28, 148.37, 146.68, 146.04, 143.87, 137.21, 134.97, 132.14, 126.73, 126.45 (d, J = 4.4 Hz), 126.08, 125.88, 124.02, 122.53 (d, J = 8.8 Hz), 116.14, 115.99, 58.69, 18.45. | 472.1287 |
| GFY-3 | δ 12.85 (s, 1H), 8.71 (s, 1H), 8.31 (s, 1H), 7.76 (dd, J = 8.8, 4.9 Hz, 2H), 7.66 (d, J = 7.8 Hz, 1H), 7.29 – 7.22 (m, 3H), 7.17 (d, J = 8.1 Hz, 1H), 7.04 (t, J = 7.6 Hz, 1H), 5.56 (t, J = 5.2 Hz, 1H), 4.76 (d, J = 5.1 Hz, 2H), 2.41 (s, 3H). | δ 159.51 (d, J = 37.9 Hz), 158.10, 152.96, 147.70, 146.75, 145.96, 143.53, 136.91, 135.04 (d, J = 2.5 Hz), 131.98 (d, J = 5.0 Hz), 127.12, 125.48, 123.65, 122.50, 122.03 (d, J = 8.0 Hz), 120.75, 116.33, 116.15, 112.26, 58.50, 56.11, 18.84 (d, J = 2.9 Hz). | 434.1519 |
| GFY-4 | δ 12.19 (s, 1H), 8.63 (s, 1H), 8.30 (s, 1H), 7.74 (dd, J = 9.2, 4.9 Hz, 2H), 7.35 (t, J = 8.1 Hz, 1H), 7.23 (t, J = 8.9 Hz, 2H), 7.05 – 6.99 (m, 2H), 6.80 (dd, J = 8.3, 2.7 Hz, 1H), 5.56 (t, J = 5.3 Hz, 1H), 4.75 (d, J = 5.2 Hz, 2H), 2.37 (s, 3H). | δ 159.83 (d, J = 42.4 Hz), 148.17, 146.73, 145.45, 145.10, 143.48, 136.65, 134.85 (d, J = 2.5 Hz), 131.93, 130.03, 126.15, 125.62, 122.41, 122.03 (d, J = 8.0 Hz), 116.30, 116.12, 116.03, 111.49, 109.06, 58.47, 55.68, 18.75. | 434.1519 |
| GFY-5 | δ 12.40 (s, 1H), 8.60 (s, 1H), 8.31 (s, 1H), 7.79 – 7.75 (m, 2H), 7.52 (dd, J = 9.1, 2.4 Hz, 2H), 7.28 – 7.23 (m, 2H), 7.03 (d, J = 9.0 Hz, 2H), 5.55 (t, J = 5.3 Hz, 1H), 4.76 (d, J = 5.5 Hz, 2H), 2.48 (s, 3H). | δ 159.25 (d, J = 211.1 Hz), 157.84, 147.19, 147.02, 145.81, 143.72, 136.84, 135.88, 135.07, 132.02, 126.75, 125.51, 122.75, 122.39 (d, J = 7.9 Hz), 116.19, 116.04, 114.90, 58.70, 56.05, 18.95. | 434.1517 |
| GFY-6 | δ 12.27 (s, 1H), 8.63 (s, 1H), 8.31 (s, 1H), 7.77 – 7.74 (m, 2H), 7.44 (s, 1H), 7.40 (t, J = 7.7 Hz, 1H), 7.32 (d, J = 6.6 Hz, 1H), 7.25 (t, J = 8.9 Hz, 2H), 7.18 (d, J = 7.5 Hz, 1H), 5.56 (t, J = 5.3 Hz, 1H), 5.24 (t, J = 5.7 Hz, 1H), 4.76 (d, J = 5.2 Hz, 2H), 4.56 (d, J = 5.8 Hz, 2H), 2.39 (s, 3H). | δ 159.81, 158.11, 148.04, 146.75, 146.00, 143.87, 143.64, 143.51, 136.44, 131.94, 128.99, 126.38, 123.75, 122.16, 122.10, 122.03, 121.69, 116.36, 116.18, 63.22, 58.49, 18.85. | 434.1521 |
| GFY-7 | δ 14.26 (s, 1H), 13.45 (s, 1H), 13.13 (s, 1H), 12.57 (dd, J = 9.2, 4.9 Hz, 2H), 12.08 (t, J = 8.9 Hz, 2H), 11.70 (s, 1H), 11.55 (t, J = 2.2 Hz, 1H), 11.48 – 11.43 (m, 1H), 10.39 (d, J = 4.9 Hz, 1H), 9.99 (t, J = 5.9 Hz, 1H), 9.59 (d, J = 4.1 Hz, 2H), 9.30 (d, J = 5.0 Hz, 2H), 8.15 (s, 2H), 7.26 (s, 3H), 6.06 (s, 1H). | δ 159.86 (d, J = 33.8 Hz), 158.09 (d, J = 4.0 Hz), 147.77, 146.76, 145.99, 144.90, 144.34, 143.50, 136.33, 134.90 (d, J = 2.6 Hz), 131.90, 126.25, 122.47, 121.93 (d, J = 7.9 Hz), 116.35, 116.17, 112.62, 110.92, 109.12, 63.27, 58.48, 18.90. | 450.1470 |
| GFY-8 | δ 12.95 (s, 1H), 8.78 (s, 1H), 8.49 (td, J = 9.1, 6.1 Hz, 1H), 8.32 (s, 1H), 7.50 – 7.40 (m, 3H), 7.34 (d, J = 8.2 Hz, 1H), 7.18 (dd, J = 19.2, 8.1 Hz, 2H), 5.59 (t, J = 5.3 Hz, 1H), 5.26 (t, J = 5.6 Hz, 1H), 4.77 (d, J = 5.3 Hz, 2H), 4.57 (d, J = 5.6 Hz, 2H), 2.43 (s, 3H). | δ 159.44, 148.34, 146.80, 146.13, 143.86, 143.56, 143.11, 137.84, 132.04, 128.96, 124.87, 123.99, 122.40, 122.35, 121.79, 111.88, 104.68, 63.24, 58.51, 18.95. | 452.1420 |
| GFY-9 | δ 12.93 (s, 1H), 9.44 (s, 1H), 8.76 (s, 1H), 8.48 (td, J = 9.1, 6.1 Hz, 1H), 8.32 (s, 1H), 7.45 (t, J = 8.5 Hz, 1H), 7.17 (t, J = 7.9 Hz, 1H), 6.92 (s, 1H), 6.75 (s, 1H), 6.64 (s, 1H), 5.58 (t, J = 5.3 Hz, 1H), 5.17 (t, J = 5.7 Hz, 1H), 4.77 (d, J = 5.3 Hz, 2H), 4.46 (d, J = 5.6 Hz, 2H), 2.45 (s, 3H). | δ 159.49, 158.08, 148.12, 146.84, 146.13, 144.82, 143.92, 143.56, 137.71, 132.02, 124.92, 122.67, 122.41, 112.69, 111.11, 109.33, 63.29, 58.52, 18.98. | 468.1376 |
| GFY-10 | δ 12.33 (s, 1H), 8.62 (s, 1H), 8.30 (s, 1H), 7.69 (d, J = 8.9 Hz, 2H), 7.58 (d, J = 8.9 Hz, 2H), 7.44 – 7.38 (m, 2H), 7.31 (d, J = 8.7 Hz, 2H), 7.18 (d, J = 7.9 Hz, 1H), 5.56 (t, J = 5.3 Hz, 1H), 5.24 (t, J = | δ 159.87, 147.86, 146.59, 145.84, 143.72, 143.45, 143.37, 137.65, 136.38, 132.29, 132.01, 131.80, 128.84, 126.16, 123.60, 122.31, 121.99, 121.50, 116.34, 63.07, | 494.0717 |

TABLE 2-continued

1H—NMR, 13C—NMR, and HRMS data of the compound GFY-1~GFY-31

| Compd. | ¹H—NMR(DMSO-d6, 500 MHz, TMS), δ(ppm) | ¹³C—NMR(DMSO-d6, 126 MHz, TMS), δ(ppm) | HRMS(m/z) |
|---|---|---|---|
| | 5.7 Hz, 1H), 4.75 (d, J = 5.3 Hz, 2H), 4.56 (d, J = 5.6 Hz, 2H), 2.38 (s, 3H). | 58.33, 18.69. | |
| GFY-11 | δ 12.35 (s, 1H), 9.42 (s, 1H), 8.60 (s, 1H), 8.31 (s, 1H), 7.68 (d, J = 8.9 Hz, 2H), 7.59 (d, J = 9.0 Hz, 2H), 6.87 (s, 1H), 6.71 (t, J = 2.1 Hz, 1H), 6.63 (s, 1H), 5.55 (t, J = 5.3 Hz, 1H), 5.16 (t, J = 5.7 Hz, 1H), 4.76 (d, J = 5.3 Hz, 2H), 4.47 (d, J = 5.8 Hz, 2H), 2.43 (s, 3H). | δ 159.42, 157.46, 147.12, 146.13, 145.35, 144.27, 143.74, 142.87, 137.18, 135.72, 131.83, 131.30, 125.74, 121.83, 121.43, 115.82, 111.90, 110.23, 108.39, 62.61, 57.84, 18.24. | 510.0664 |
| GFY-12 | δ 12.34 (s, 1H), 8.61 (s, 1H), 8.30 (s, 1H), 7.98 – 7.93 (m, 1H), 7.48 – 7.44 (m, 2H), 7.40 (t, J = 7.7 Hz, 2H), 7.32 (d, J = 8.1 Hz, 1H), 7.18 (d, J = 7.5 Hz, 1H), 5.56 (t, J = 5.3 Hz, 1H), 5.24 (t, J = 5.7 Hz, 1H), 4.75 (d, J = 5.2 Hz, 2H), 4.56 (d, J = 5.6 Hz, 2H), 2.39 (s, 3H). | δ 160.10, 150.57, 150.47, 147.86, 146.65 (d, J = 13.0 Hz), 145.99, 145.45, 143.83, 143.49 (d, J = 5.6 Hz), 136.62, 131.93, 128.96, 125.99, 123.81, 122.32 (d, J = 9.3 Hz), 121.75, 118.36, 118.22, 116.77, 109.45, 109.27, 63.22, 58.45, 18.84. | 452.1425 |
| GFY-13 | δ 12.36 (s, 1H), 9.42 (s, 1H), 8.60 (s, 1H), 8.30 (s, 1H), 7.96 (ddd, J = 12.8, 7.3, 2.5 Hz, 1H), 7.54 – 7.44 (m, 1H), 7.37 (d, J = 9.0 Hz, 1H), 6.88 (s, 1H), 6.72 (t, J = 2.2 Hz, 1H), 6.63 (d, J = 1.8 Hz, 1H), 5.55 (t, J = 5.3 Hz, 1H), 5.16 (t, J = 5.8 Hz, 1H), 4.75 (d, J = 5.2 Hz, 2H), 4.47 (d, J = 5.8 Hz, 2H), 2.43 (s, 3H). | δ 160.33, 158.30, 147.59 (d, J = 38.1 Hz), 146.93, 146.05, 144.99, 144.57, 136.53, 135.61, 132.06, 126.41, 122.55, 118.26, 118.14, 117.01 (d, J = 5.4 Hz), 112.80, 111.37, 109.85, 109.71, 109.39, 63.62, 58.70, 18.76. | 468.1374 |
| GFY-14 | δ 12.33 (s, 1H), 8.62 (s, 1H), 8.31 (s, 1H), 7.77 – 7.74 (m, 2H), 7.47 – 7.44 (m, 2H), 7.44 (s, 1H), 7.40 (t, J = 7.6 Hz, 1H), 7.31 (d, J = 6.3 Hz, 1H), 7.18 (d, J = 7.6 Hz, 1H), 5.56 (t, J = 5.3 Hz, 1H), 5.24 (t, J = 5.7 Hz, 1H), 4.76 (d, J = 5.3 Hz, 2H), 4.56 (d, J = 5.8 Hz, 2H), 2.39 (s, 3H). | δ 159.93, 148.00, 146.72, 145.99, 143.86, 143.54 (d, J = 5.9 Hz), 137.38, 136.55, 131.94, 129.51, 129.24, 128.99, 128.40, 126.19, 125.55, 123.78, 122.43, 122.19, 121.75, 121.67, 63.22, 58.47, 18.84. | 450.1224 |
| GFY-15 | δ 12.35 (s, 1H), 9.42 (s, 1H), 8.61 (s, 1H), 8.31 (s, 1H), 7.74 (d, J = 9.0 Hz, 2H), 7.47 (d, J = 8.9 Hz, 2H), 6.87 (t, J = 1.6 Hz, 1H), 6.72 (t, J = 2.1 Hz, 1H), 6.65 – 6.61 (m, 1H), 5.55 (t, J = 5.3 Hz, 1H), 5.16 (t, J = 5.7 Hz, 1H), 4.76 (d, J = 5.0 Hz, 2H), 4.47 (d, J = 5.6 Hz, 2H), 2.43 (s, 3H). | δ 160.00, 158.11, 147.77, 146.76, 146.00, 144.91, 144.35, 143.51, 137.41, 136.39, 131.93, 129.56, 129.24, 126.29, 122.46, 121.71, 112.57, 110.90, 109.07, 63.26, 58.48, 18.89. | 466.1173 |
| GFY-16 | δ 12.21 (s, 1H), 10.00 (s, 1H), 8.58 (s, 1H), 8.31 (s, 1H), 8.10 (dd, J = 6.9, 2.6 Hz, 1H), 7.74 (s, 1H), 7.57 (ddd, J = 9.0, 4.3, 2.6 Hz, 1H), 7.46 (t, J = 9.1 Hz, 1H), 7.37 – 7.30 (m, 2H), 7.15 – 7.11 (m, 1H), 5.57 (s, 1H), 4.76 (s, 2H), 2.38 (s, 3H), 2.06 (s, 3H). | δ 168.79, 160.39, 155.33, 153.71, 148.01, 146.82, 144.40, 143.77, 140.53, 136.60, 135.80 (d, J = 3.4 Hz), 132.06, 129.33, 126.57, 122.52, 122.25, 121.02 (d, J = 7.1 Hz), 120.24 (d, J = 18.6 Hz), 118.28, 117.61 (d, J = 21.7 Hz), 116.79, 114.74, 58.69, 24.40, 18.62.j | 495.1234 |
| GFY-17 | δ 12.87 (s, 1H), 10.02 (s, 1H), 8.78 (s, 1H), 8.49 (td, J = 9.0, 6.0 Hz, 1H), 8.33 (s, 1H), 7.78 (s, 1H), 7.45 (ddd, J = 11.6, 9.0, 3.0 Hz, 1H), 7.36 (d, J = 5.3 Hz, 2H), 7.21 – 7.12 (m, 2H), 5.60 (s, 1H), 4.78 (d, J = 4.6 Hz, 2H), 2.40 (s, 3H), 2.06 (s, 3H). | δ 168.79, 159.63 (d, J = 19.0 Hz), 157.98 (d, J = 11.6 Hz), 154.37, 152.69 (d, J = 12.2 Hz), 148.43, 146.83, 146.18, 144.05, 143.80, 140.53, 137.78, 132.12, 129.28, 125.32, 123.57 (d, J = 11.8 Hz), 123.42 (d, J = 9.3 Hz), 122.46, 118.41, 114.71, 111.78 (d, J = 22.1 Hz), 104.54 (d, J = 24.8 Hz), 104.28, 58.71, 18.66. | 479.1534 |
| GFY-18 | δ 12.14 (s, 1H), 8.64 (s, 1H), 8.31 (s, 1H), 7.77 (dd, J = 9.2, 5.0 Hz, 2H), 7.52 (dd, J = 9.0, 5.2 Hz, 2H), 7.29 (t, J = 8.9 Hz, 2H), 7.25 (t, J = 8.9 Hz, 2H), 5.59 – 5.54 (m, 1H), 4.77 (d, J = 5.0 Hz, 2H), 2.40 (s, 3H). | δ 160.56 (d, J = 236.1 Hz), 159.94, 158.96 (d, J = 234.6 Hz), 148.37, 146.82, 145.91, 143.77, 140.59, 136.55, 135.00, 132.07, 126.70, 125.48 (d, J = 16.1 Hz), 122.62, 122.48 (d, J = 15.6 Hz), 116.16, 115.95 (d, J = 42.1 Hz), 58.69, 18.68. | 422.1312 |
| GFY-19 | δ 11.76 (s, 1H), 8.68 (s, 1H), 8.34 (s, 1H), 7.78 (dd, J = 9.2, 5.0 Hz, 2H), 7.25 (d, J = 8.9 Hz, 2H), 7.22 – 7.13 (m, 2H), 7.07 (t, J = 9.5 Hz, 1H), 5.58 (t, J = 5.3 Hz, 1H), 4.78 (d, J = 5.3 Hz, 2H), 2.37 (s, 3H). | δ 168.79, 159.63 (d, J = 19.1 Hz), 157.98 (d, J = 11.6 Hz), 154.37, 148.43, 146.83, 146.18, 144.03 (d, J = 5.7 Hz), 143.80, 140.53, 137.78, 132.12, 129.28, 125.32, 123.42 (d, J = 9.3 Hz), 122.46, 118.41, 116.99, 114.71, 111.78 (d, J = 22.1 Hz), 104.54 (d, J = 24.3 Hz), 104.28, 58.71, 24.38, 18.66. | 440.1226 |
| GFY-20 | δ 11.92 (s, 1H), 8.66 (s, 1H), 8.32 (d, J = 6.9 Hz, 1H), 7.77 (ddt, J = 8.9, 6.0, 3.1 Hz, 2H), 7.62 (ddd, J = 12.4, 7.4, 2.5 Hz, 1H), 7.50 (dt, J = 10.8, 9.0 Hz, 1H), 7.34 – 7.27 (m, 2H), 7.24 (t, J = 8.9 Hz, 2H), 5.57 (t, J = 5.3 Hz, 1H), 4.77 (d, J = 5.2 Hz, 2H), 2.40 (s, 3H). | δ 160.04 (d, J = 49.6 Hz), 158.61, 150.88, 149.13, 148.32, 146.76, 145.97, 143.85, 141.47, 137.04, 134.96, 132.13, 126.66, 125.48, 122.57 (d, J = 6.6 Hz), 120.55, 117.85 (d, J = 17.8 Hz), 116.06 (d, J = 22.3 Hz), 112.86 (d, J = 19.2 Hz), 58.69, 18.61. | 440.1223 |
| GFY-21 | δ 12.19 (s, 1H), 8.61 (s, 1H), 8.30 (s, 1H), 8.09 (dd, J = 6.7, 2.6 Hz, 1H), 7.59 (ddd, J = 9.1, 4.3, 2.6 Hz, 1H), 7.57 – 7.45 (m, 2H), 7.43 (d, J = 9.0 Hz, 1H), 7.28 (t, J = 8.8 Hz, 2H), 5.56 (t, J = 5.3 Hz, 1H), 4.75 (d, J = 5.2 Hz, 2H), 2.38 (s, 3H). | δ 161.03, 159.73 (d, J = 92.1 Hz), 154.48 (d, J = 244.5 Hz), 148.16, 146.74, 145.89, 143.78, 140.28 (d, J = 2.8 Hz), 136.88, 135.66 (d, J = 3.3 Hz), 132.03, 126.02, 125.63 (d, J = 8.3 Hz), 122.40, 122.16, 120.94 (d, J = 7.1 Hz), 120.20 (d, J = | 456.0930 |

TABLE 2-continued

1H—NMR, 13C—NMR, and HRMS data of the compound GFY-1~GFY-31

| Compd. | $^1$H—NMR(DMSO-d6, 500 MHz, TMS), δ(ppm) | $^{13}$C—NMR(DMSO-d6, 126 MHz, TMS), δ(ppm) | HRMS(m/z) |
|---|---|---|---|
| GFY-22 | δ 11.82 (s, 1H), 8.66 (s, 1H), 8.32 (s, 1H), 8.09 (dd, J = 6.8, 2.6 Hz, 1H), 7.63 (ddd, J = 9.1, 4.3, 2.7 Hz, 1H), 7.43 (t, J = 9.0 Hz, 1H), 7.30 – 7.12 (m, 2H), 7.07 (tt, J = 9.5, 2.4 Hz, 1H), 5.58 (t, J = 5.1 Hz, 1H), 4.76 (d, J = 4.5 Hz, 2H), 2.36 (s, 3H). | 18.3 Hz), 117.46 (d, J = 21.8 Hz), 115.91 (d, J = 22.4 Hz), 58.65, 18.67.<br>δ 164.11 (d, J = 15.1 Hz), 162.48 (d, J = 15.1 Hz), 160.24, 155.38, 153.76, 146.70, 146.03, 143.90, 137.62, 135.66 (d, J = 3.1 Hz), 126.41, 122.46 (d, J = 5.4 Hz), 121.32 (d, J = 7.2 Hz), 120.15 (d, J = 18.6 Hz), 117.51 (d, J = 21.9 Hz), 107.10 (d, J = 6.2 Hz), 106.96 (d, J = 6.1 Hz), 100.58 (d, J = 26.2 Hz), 100.32, 58.67, 18.40. | 474.0835 |
| GFY-23 | δ 11.99 (s, 1H), 8.62 (s, 1H), 8.30 (s, 1H), 8.07 (dd, J = 6.8, 2.6 Hz, 1H), 7.69 – 7.54 (m, 2H), 7.49 (dt, J = 10.8, 9.0 Hz, 1H), 7.40 (t, J = 9.1 Hz, 1H), 7.30 (dq, J = 8.3, 2.6 Hz, 1H), 5.57 (d, J = 5.1 Hz, 1H), 4.74 (d, J = 2.8 Hz, 2H), 2.38 (s, 3H). | δ 160.13, 155.34, 153.72, 150.81 (d, J = 13.5 Hz), 149.18 (d, J = 13.5 Hz), 148.93, 148.32 (d, J = 12.5 Hz), 146.80 – 146.63 (m), 145.96, 143.86, 141.22 (d, J = 7.9 Hz), 137.28, 135.65 (d, J = 3.3 Hz), 132.11, 122.38 (d, J = 14.0 Hz), 121.15 (d, J = 7.0 Hz), 120.63 (t, J = 4.5 Hz), 120.17 (d, J = 18.6 Hz), 117.79 (d, J = 18.0 Hz), 117.47 (d, J = 21.9 Hz), 112.94 (d, J = 18.7 Hz), 58.65, 18.59. | 474.0834 |
| GFY-24 | δ 12.06 (s, 1H), 8.62 (s, 1H), 8.32 (s, 1H), 8.10 (dd, J = 6.9, 2.6 Hz, 1H), 7.62 (ddd, J = 9.0, 4.3, 2.6 Hz, 1H), 7.59 – 7.46 (m, 4H), 7.45 (d, J = 9.0 Hz, 1H), 5.57 (t, J = 5.3 Hz, 1H), 4.76 (d, J = 5.2 Hz, 2H), 2.38 (s, 3H). | δ 160.32, 154.54 (d, J = 244.5 Hz), 148.52, 146.78, 146.00, 143.83, 143.17, 136.93, 135.75, 135.72, 132.11, 129.78, 129.24, 126.53, 125.45, 122.43 (d, J = 25.2 Hz), 121.17 (d, J = 7.2 Hz), 120.18 (d, J = 18.3 Hz), 117.56 (d, J = 22.0 Hz), 58.68, 18.65. | 472.0632 |
| GFY-25 | δ 11.75 (s, 1H), 8.67 (s, 1H), 8.34 (s, 1H), 8.11 (dd, J = 6.9, 2.6 Hz, 1H), 7.74 (d, J = 1.8 Hz, 2H), 7.66 (q, J = 2.1 Hz, 2H), 7.46 (t, J = 9.0 Hz, 1H), 5.58 (t, J = 5.3 Hz, 1H), 4.77 (d, J = 5.3 Hz, 2H), 2.38 (s, 3H). | δ 160.27, 154.58 (d, J = 244.5 Hz), 149.83, 147.49, 146.71, 146.03, 143.89, 137.74, 135.68, 132.21, 129.95, 126.44, 125.74, 122.73, 122.60, 122.49, 121.47, 120.11 (d, J = 18.5 Hz), 117.50 (d, J = 21.7 Hz), 58.67, 18.42. | 595.9211 |
| GFY-26 | δ 11.87 (s, 1H), 8.64 (s, 1H), 8.33 (s, 1H), 8.09 (dd, J = 6.8, 2.6 Hz, 1H), 7.96 (d, J = 2.4 Hz, 1H), 7.80 (d, J = 8.5 Hz, 1H), 7.64 (ddd, J = 9.0, 4.3, 2.6 Hz, 1H), 7.45 (t, J = 9.0 Hz, 1H), 7.38 (dd, J = 8.5, 2.4 Hz, 1H), 5.58 (t, J = 5.3 Hz, 1H), 4.77 (d, J = 5.2 Hz, 2H), 2.39 (s, 3H). | δ 160.19, 154.55 (d, J = 244.5 Hz), 149.23, 146.71, 146.03, 144.95, 143.89, 137.46, 135.67 (d, J = 3.2 Hz), 134.23, 128.63, 126.41, 125.12, 124.26, 122.49, 122.42, 121.23 (d, J = 7.2 Hz), 120.22, 120.10, 119.75, 117.49 (d, J = 21.9 Hz), 58.67, 18.62. | 595.9028 |
| GFY-27 | δ 11.70 (s, 1H), 8.68 (s, 1H), 8.34 (s, 1H), 7.81 – 7.76 (m, 2H), 7.74 (d, J = 1.8 Hz, 2H), 7.66 (t, J = 1.8 Hz, 1H), 7.26 – 7.22 (m, 2H), 5.58 (t, J = 5.3 Hz, 1H), 4.78 (d, J = 5.4 Hz, 2H), 2.38 (s, 3H). | δ 160.25, 159.87, 150.02, 147.56, 146.71, 146.01, 143.88, 137.57, 134.92, 132.19, 129.95, 126.65, 125.72, 122.77, 122.59, 116.02 (d, J = 22.5 Hz), 58.69, 18.44. | 561.9600 |
| GFY-28 | δ 11.82 (s, 1H), 8.66 (s, 1H), 8.33 (s, 1H), 7.97 (d, J = 2.3 Hz, 1H), 7.84 – 7.72 (m, 3H), 7.38 (dd, J = 8.5, 2.4 Hz, 1H), 7.24 (t, J = 8.9 Hz, 2H), 5.58 (t, J = 5.3 Hz, 1H), 4.77 (d, J = 5.3 Hz, 2H), 2.40 (s, 3H). | δ 160.04 (d, J = 51.8 Hz), 158.61, 149.42, 146.73, 146.02, 145.09, 143.88, 137.25, 134.95, 134.28, 132.14, 128.58, 126.73, 125.08, 124.28, 122.63 (d, J = 3.6 Hz), 122.58, 119.68, 116.04 (d, J = 22.4 Hz), 58.69, 18.62. | 561.9606 |
| GFY-29 | δ 12.03 (s, 1H), 8.64 (s, 1H), 8.32 (s, 1H), 7.80 – 7.74 (m, 2H), 7.53 – 7.45 (m, 4H), 7.25 (t, J = 8.8 Hz, 2H), 5.57 (t, J = 5.3 Hz, 1H), 4.77 (d, J = 5.3 Hz, 2H), 2.38 (s, 3H). | δ 160.05 (d, J = 39.2 Hz), 158.58, 148.70, 146.78, 145.98, 143.81, 143.24, 136.78, 135.00, 132.09, 129.74, 129.27, 126.73, 125.41, 122.61, 122.50 (d, J = 7.2 Hz), 116.08 (d, J = 22.5 Hz), 58.69, 18.66. | 438.1022 |

Embodiment 3: Validation of a-Glucosidase Inhibitory Activity of Compounds GFY-1~GFY-29

1. Determination of inhibitory activity of GFY-1~GFY-31 at concentration of 250 μmol/L An in vitro a-glucosidase activity assay was used for activity determination:

the compounds were weighed separately, and dissolved in dimethylsulfoxide (DMSO) to prepare 250 μmol/L of a reagent for a subsequent experiment. In short, a-glucosidase solution with a final concentration of 0.5 U/ml was reacted with 250 μmol/L of the compound and 0.6 mM of pNaGP solution in 0.1 mM, pH 6.8 phosphate buffer solution, to determine the inhibitory effect of the compound on an a-glucosidase conversion substrate. At the same time, acarbose and DMSO were respectively used as a standard inhibitor and a control inhibitor. 250 μmol/L (10 μL) of the compound, enzyme solution (40 μL), and potassium phosphate buffer solution (100 μL) were pre-incubated in a 96-well plate at 37° C. for 10 min. Then, 50 μL of the substrate (pNaGP, 0.6 mM) was added to each micropore, it was incubated at 37° C. for 20 min, the absorbance was measured at 405 nm, and changes in enzyme activity were detected.

The formula for calculating the enzyme inhibitory activity of the compound tested was as follows:

Inhibition rate % =

$$\frac{\text{Blank absorbance value} - \text{Sample absorbance value}}{\text{Blank absorbance value}} \times 100$$

2. Determination of IC50 values of GFY-1~GFY-29 for a-glucosidase

The in vitro a-glucosidase activity assay was used for activity determination:

after the compounds were weighed separately, it was dissolved in DMSO to prepare 1 mmol/L of mother solution, and it was diluted in gradient to 500 µmol/L, 250 µmol/L, 125 µmol/L, 62.5 µmol/L, 31.25 µmol/L, 15.625 µmol/L and 7.8125 µmol/L. The different concentrations of the compounds (10 µL), 0.5 U/ml of enzyme solution (40 µL), and 0.1 mM, pH 6.8 phosphate buffer solution (100 µL) were pre-incubated in the 96-well plate at 37° C. for 10 min. Then, 50 µL of the substrate (pNaGP, 0.6 mM) was added to each micropore, it was incubated at 37° C. for 20 min, the absorbance was measured at 405 nm, and changes in enzyme activity were detected. At the same time, the acarbose and DMSO were respectively used as the standard inhibitor and the control inhibitor.

TABLE 3

Inhibitory activity and IC50 values of GFY-1~GFY-29 for α-glucosidase at concentration of 250 µmol/L

| Number | Inhibition rate % | IC50 values |
|---|---|---|
| GFY-1 | 0.23042 | — |
| GFY-2 | 0.13832 | — |
| GFY-3 | 0.04799 | — |
| GFY-4 | 0.30769 | — |
| GFY-5 | 0.87055 | 34.35 |
| GFY-6 | 0.93472 | 33.62 |
| GFY-7 | 0.45254 | — |
| GFY-8 | 0.9788 | 15.41 |
| GFY-9 | 0.29288 | — |
| GFY-10 | 0.9923 | 22.96 |
| GFY-11 | 0.94635 | 106.75 |
| GFY-12 | 0.94323 | 78.85 |
| GFY-13 | 0.13978 | — |
| GFY-14 | 0.97627 | 9.84 |
| GFY-15 | 0.98107 | 65.90 |
| GFY-16 | 0.89604 | 140.40 |
| GFY-17 | 0.31045 | — |
| GFY-18 | 0.71434 | 20.38 |
| GFY-19 | 0.96834 | 46.43 |
| GFY-20 | 0.9556 | 20.11 |
| GFY-21 | 0.99916 | 43.12 |
| GFY-22 | 0.86819 | 37.01 |
| GFY-23 | 0.22127 | — |
| GFY-24 | 0.99833 | 16.59 |
| GFY-25 | 0.69628 | — |
| GFY-26 | 0.62651 | — |
| GFY-27 | 0.56656 | — |
| GFY-28 | 0.64035 | — |
| GFY-29 | 0.94686 | 26.97 |
| GFY-30 | 0.99742 | 26.67 |
| GFY-31 | 0.99742 | 37.01 |
| acarbose | — | 562.22 |

As can be seen from Table 3, the GFY series compounds had a certain inhibitory effect on the a-glucosidase and exhibited broad-spectrum properties. However, there were significant differences in the inhibitory effects of the different compounds on the a-glucosidase, but overall, the compounds as skeletons exhibited good inhibitory effects on the a-glucosidase.

Embodiment 4: Fluorescence Quenching Experiment of Compounds on a-Glucosidase

Figure 1:
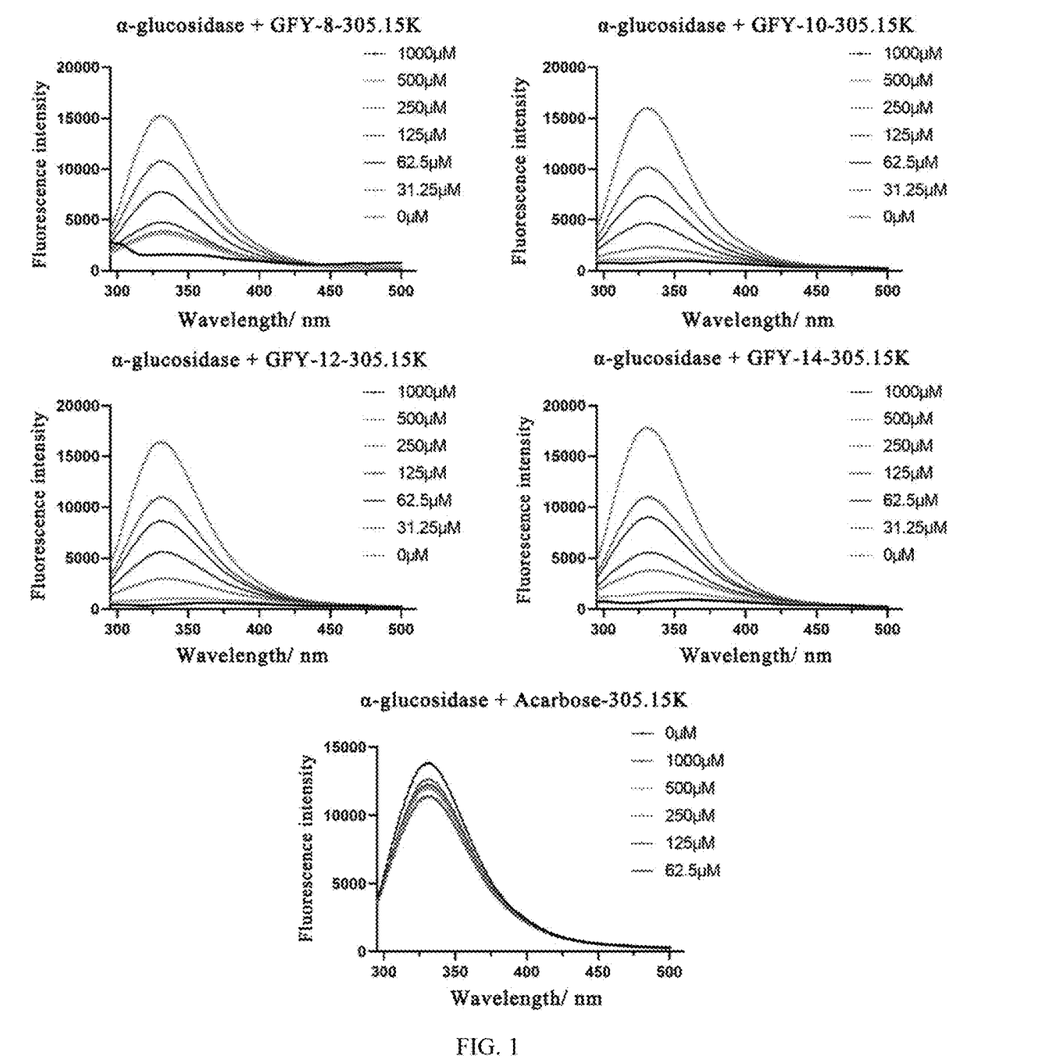
FIG. 1 is a fluorescence quenching value of a GFY compound on a-glucosidase.

The a-glucosidase (1.0 mL, 2U/m L) was titrated with different concentrations of inhibitor solution (1.0 mL, 0~1000 mM), it was equilibrated for 5 min, and fluorescence measurement was performed. The fluorescence intensity of reaction solution was measured by using a fluorescence spectrometer (Type F-7100 in Tokyo, Japan) at different temperatures (305.15, 310.15 and 315.15 K). The excitation and emission slit width was set to 5.0 nm, the excitation wavelength was 280 nm, and the emission wavelength range was 290 nm~500 nm. The results were shown in FIG. 1, the fluorescence quenching of a-glucosidase might be used to represent the affinity between compounds and enzymes. The a-glucosidase exhibited the strongest endogenous fluorescence caused by Trp and Tyr residues at around 340 nm. Therefore, the degree of binding might be determined by measuring the effect of the compounds on emission spectra of two enzymes. From FIG. 1, it might be seen that the fluorescence intensity of the enzyme was decreased significantly with the increase of the compound concentration, it was indicated that all five compounds might quench the intrinsic fluorescence of the enzyme and bind to it. However, by comparing the effects of the compounds on enzyme fluorescence at the same concentration, it might be seen that the GFY compounds had the greater impact on the fluorescence quenching value of the a-glucosidase. This also indicated that the GFY compounds had the stronger affinity and interaction with the a-glucosidase, thereby it had the stronger inhibitory effect on the enzyme.

Embodiment 5: In Vitro Starch Digestion Inhibition Experiment

The effects of inhibitors on in vitro digestibility of starch were determined by using a slightly modified Englyst method. Corn starch (300 mg) and guar gum (25 mg) were added into a 50 mL centrifuge tube and dissolved in 7.5 mL of distilled water. It was boiled in a boiling water bath for 10 min, and cooled to the room temperature, and sodium acetate buffer solution (2.5 mL, 0.4 M, pH 5.2, 0.18% (w/v) $CaCl_2$)) was added. After the sample tube was equilibrated at 37° C. for 15 min, a mixture of fresh pig trypsin extract, starch glycosidase, and inhibitor was added to hydrolyze the starch. Meanwhile, a non-inhibitor group and an acarbose group were used as a blank and a positive control. At 20 min, 60 min, 120 min, 240 min and 360 min, 250 µL of a starch hydrolysate was taken from the centrifuge tube, and 10.0 mL of 66% (v/v) ethanol was added. Glucose generation was measured by using a d-glucose assay kit (GOPOD).

Figure 2:
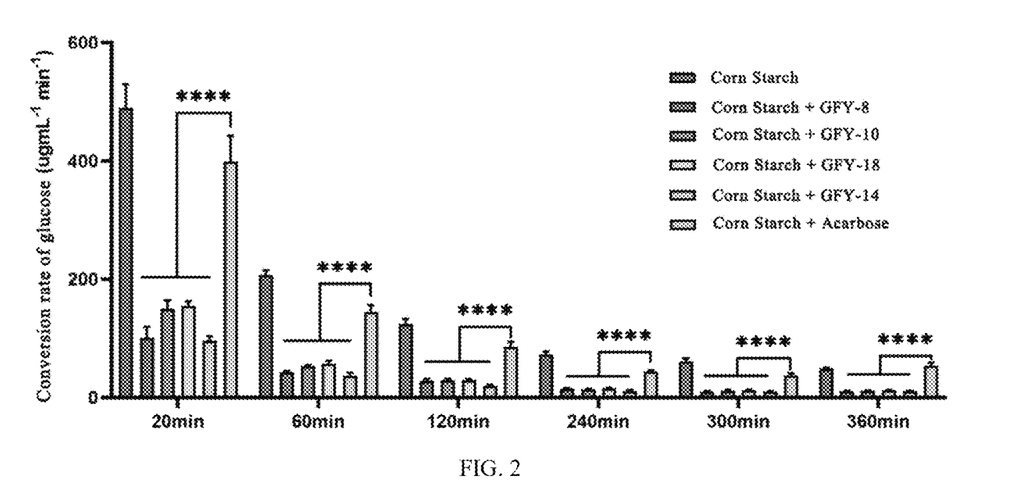
FIG. 2 is an effect of the GFY compound on a-glucosidase activity.

The results were shown in FIG. 2, results showed that the GFY compounds might significantly inhibit the conversion of starch to glucose by inhibiting a-glucosidase activity, and have an extremely high potential for anti-diabetes.

The above mentioned embodiment are preferred embodiments which are cited only for fully explaining the present invention, and the protection scope is not limited thereto. The equivalent substitution or transformation made by persons skilled in the art on the basis of the invention are within the protection scope of the invention.

The invention claimed is:
1. A compound with a-glucosidase inhibitory activity having a structure shown in General formula (I) below:

wherein R1 is halogen, R2 is a C1-C2 alcoholic hydroxyl.

2. A pharmaceutical composition for treating diabetes, wherein the pharmaceutical composition comprises the compound according to claim 1 and a pharmaceutically acceptable carrier.

3. A method for treating diabetes comprising administering a compound according to claim 1 to a patient in need thereof.

\* \* \* \* \*